US006669569B2

(12) United States Patent
Geislinger

(10) Patent No.: US 6,669,569 B2
(45) Date of Patent: Dec. 30, 2003

(54) COUPLING MEMBER IN A TORQUE-TRANSMITTING DRIVE CONNECTION

(75) Inventor: Matthias Geislinger, Salzburg (AT)

(73) Assignee: Ellergon Antriebstechnik GmbH, Hallwang (AT)

( * ) Notice: Subject to any disclaimer, the term of this patent is extended or adjusted under 35 U.S.C. 154(b) by 0 days.

(21) Appl. No.: 09/881,132

(22) Filed: Jun. 14, 2001

(65) Prior Publication Data

US 2001/0053717 A1 Dec. 20, 2001

(30) Foreign Application Priority Data

Jun. 15, 2000 (AT) .......................................... 1031/2000

(51) Int. Cl.$^7$ ................................................ F16D 3/68
(52) U.S. Cl. ........................................... 464/92; 464/88
(58) Field of Search ............................... 464/88.91, 92, 464/96

(56) References Cited

U.S. PATENT DOCUMENTS

| 1,790,516 A | | 1/1931 | Williams | |
| 1,964,054 A | * | 6/1934 | Harris | 464/92 X |
| 2,093,420 A | * | 9/1937 | Creager | 464/96 X |
| 2,360,149 A | * | 10/1944 | Moser | 464/92 |
| 4,182,138 A | * | 1/1980 | McGuire | 464/92 |
| 4,389,204 A | * | 6/1983 | Walter | 464/91 |
| 4,411,634 A | * | 10/1983 | Hammelmann | 464/88 X |
| 4,563,166 A | * | 1/1986 | Walter et al. | 464/92 X |
| 4,708,514 A | * | 11/1987 | Walter et al. | 464/96 X |
| 5,429,552 A | * | 7/1995 | Scherner et al. | 464/92 X |
| 5,890,965 A | * | 4/1999 | Deeg et al. | 464/88 |

FOREIGN PATENT DOCUMENTS

| AT | 75332 | * | 1/1919 | 464/91 |
| AT | 395 901 | | 4/1993 | |
| CA | 640113 | * | 4/1962 | 464/91 |
| DE | 158506 | * | 4/1940 | 464/92 |
| DE | 31 09 388 | | 9/1982 | |

\* cited by examiner

*Primary Examiner*—Greg Binda
(74) *Attorney, Agent, or Firm*—Collard & Roe, P.C.

(57) ABSTRACT

A coupling member (3) for the installation in a torque-transmitting drive connection comprises connecting parts (4, 5) for fastening to the driving and driven sides of the drive connection and an annular body (8) for torque transmission which is inserted between ring disks (6, 7) of the connecting parts (4, 5) and is made of an elastomer. In order to obtain a simple coupling member which can be influenced over wide areas concerning the transmission properties, the connecting parts (4, 5) are made of fibrous composite plastic and the elastomeric annular body (8) is molded onto the ring disks (6, 7) of the connecting parts.

4 Claims, 5 Drawing Sheets

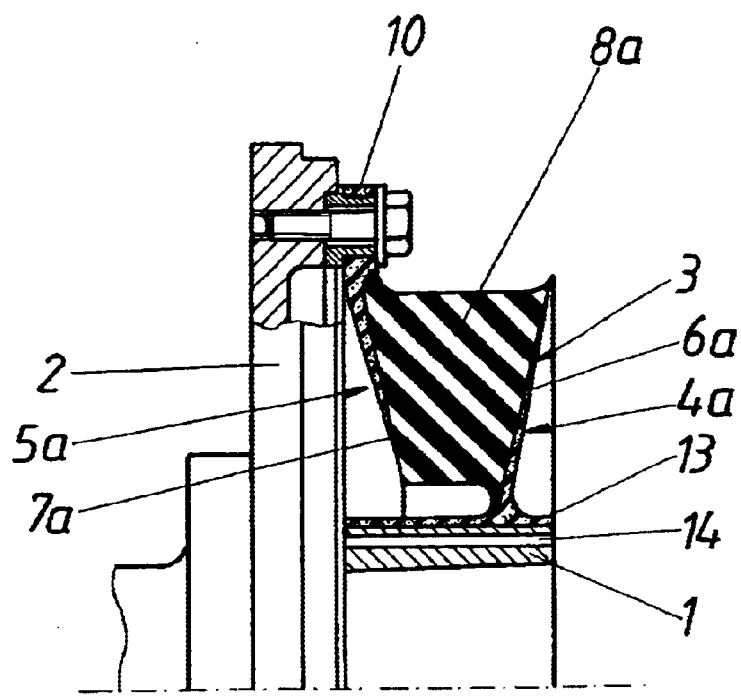
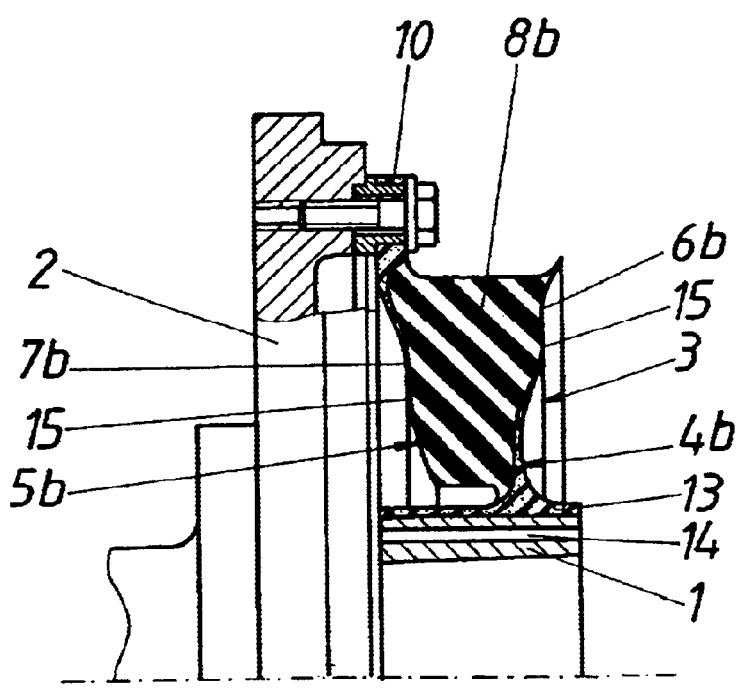

COUPLING MEMBER IN A TORQUE-TRANSMITTING DRIVE CONNECTION

FIELD OF THE INVENTION

The invention relates to a coupling member for installation in a torque-transmitting drive connection with connecting parts for fastening to the driving and driven sides of the drive connection and an annular body for torque transmission which is inserted between ring disks of the connecting parts and is made of an elastomer.

DESCRIPTION OF THE PRIOR ART

Such coupling members are known from U.S. Pat. No. 1,790,516 or DE 310 9388 A for example and substantially consist of one or several rubber-elastic annular bodies which are molded onto the annular disks of metallic connecting parts, so that the coupling member can be fastened by way of the connecting parts to the driving and driven sides of the drive connection and the annular body thus ensures a torsionally elastic transmission of torque. As a result of the elasticity properties of the annular body there is an additional damping effect and a displacement capability which remain within rather narrow limits. Moreover, such coupling members can hardly be adapted to the different conditions of the drive connection. Finally, the shaping and the working of the metallic connecting parts and the production of the required connection between rubber and metal leads to respective production efforts.

According to AT 395 901 B there are already coupling members made of fiber-reinforced plastic which are used as connecting elements between the two halves of a shaft coupling or are used directly as a shaft element in a driving strand and lead to a perfect transmission of torque. Moreover, due to the flexibility of their membrane-like flange parts, they allow the compensation of an axial displacement and, in the presence of flange parts on either side, even the compensation of radial displacement of the drive parts to be mutually coupled. However, it is necessary to substantially make do without torsional elasticity and a damping effect in the transmission of torque.

SUMMARY OF THE INVENTION

The invention is therefore based on the object of providing a coupling member of the aforementioned kind which ensures a torsionally elastic and oscillation-damping transmission of torque and is additionally characterized by its adaptation and displacement capabilities.

This object is achieved by the invention in such a way that the connecting parts are made of fibrous composite plastic and the elastomeric annular body is molded onto the ring disks of the connecting parts. As a result of the combination of the fibrous composite plastic on the connecting side with an elastomer on the torque transmission side, the possibility is provided in a simple and elegant way to optimally utilize the properties of said materials and to produce a coupling member which can be adapted over wide areas to the most diverse conditions and requirements of a drive connection. Depending on the choice of the available volume of the elastomeric the annular body, and depending on the arrangement and disposal of the annular body between receiving ring disks of the connecting parts formed by membranes, it is possible to obtain a virtually torsionally rigid or a particularly torsionally soft coupling member which can be displaced in addition angularly, axially as well as radially and acts in a manner so as to insulate the structure-borne noise and to dampen the torsional oscillation.

In order to adapt the coupling member with respect to its elasticity, damping and displacement properties as well as with respect to the required installation possibilities, there is a whole range of various constructional variants. As a result of the respective distance of the ring disks which receive the annular body between themselves, the effective volume of the elastomeric annular body can be predetermined. Various embodiments of the invention are obtained in such a way that the one connecting part comprises a ring disk and the other connecting part comprises two ring disks, with the mutually engaging ring disks receiving the annular body between themselves, that the one connecting part forms a hub sleeve with an outwardly projecting ring disk and the other connecting part forms an outer fastening flange with an inwardly projecting ring disk, that the one connecting part comprises an inner fastening flange with an outwardly projecting ring disk and the other connecting part comprises an outer fastening flange with an inwardly projecting ring disk, that the one connecting part is formed as a connecting part for two other connecting parts, which connecting part is provided with a pipe section with at least one outwardly projecting ring disk at either end, that the one connecting part forms a pipe section which at the one end converges into at least one outwardly projecting ring disk and at the other end into a fastening flange, and that the one connecting part is provided with two inner fastening flanges with outwardly projecting ring disks, which fastening flanges are mutually connected by means of spacer sleeves.

In order to take into account the force and movement conditions which change with the radius, the ring disks of at least the one connecting parts can extend along a conical surface which is coaxial to the coupling member axis, so that the cross section of the annular body increases with increasing radius.

Furthermore, the ring disks of the connecting parts can form a shaft in the axial section and/or comprise a wall thickness tapering towards the free edge, thus allowing the flexibility of the membranes obtained by the ring disks to be influenced.

In order to increase the axial displacement capability it is also possible to provide the ring disks of the connecting parts with radial slots.

If the annular body and/or the connecting parts are subdivided into segments, a simplification of the coupling member assembly is usually obtained which can then also be performed radially by way of a connecting hub.

BRIEF DESCRIPTION OF THE DRAWINGS

The subject matter of the invention is shown schematically in the drawings, wherein:

FIGS. 3, 4, 5, 6, 7, 8 and 9 show seven further embodiments of a coupling member in accordance with the invention in a halved sectional view.

DESCRIPTION OF THE PREFERRED EMBODIMENTS

Figure 1:
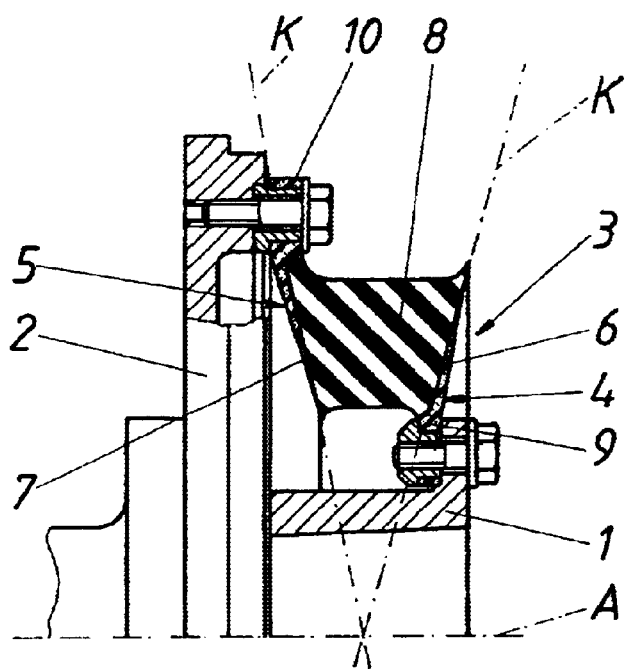
FIG. 1 shows a coupling member in accordance with the invention in a halved sectional view.

A torsionally elastic, oscillation-damping and displaceable coupling element 3 is provided for the torque-transmitting drive connection between a hub 1 and an outside rim 2, or between two hubs or two outside rims of the driving and driven sides of the drive connection. Said coupling element 3 comprises two connecting parts 4, 5 made of a fibrous composite plastic and an annular body 8 made of an elastomer which is molded onto the ring disks 6, 7 of the connecting parts 4, 5, with the connecting parts 4, 5 being used for fastening the coupling member 3 to the driving and driven sides of the drive connection and the annular body 8 assuming the torque transmission between the connecting parts. As a result of the mutual adjustment of the workpiece properties of the fibrous composite plastic on the one part, and the elastomer on the other part, in combination with the suitable shaping of the connecting parts with their ring disks and the annular body 8, influenceable transmission properties are obtained over wide ranges concerning oscillation damping, torsional elasticity and displacement capability.

Figure 2:
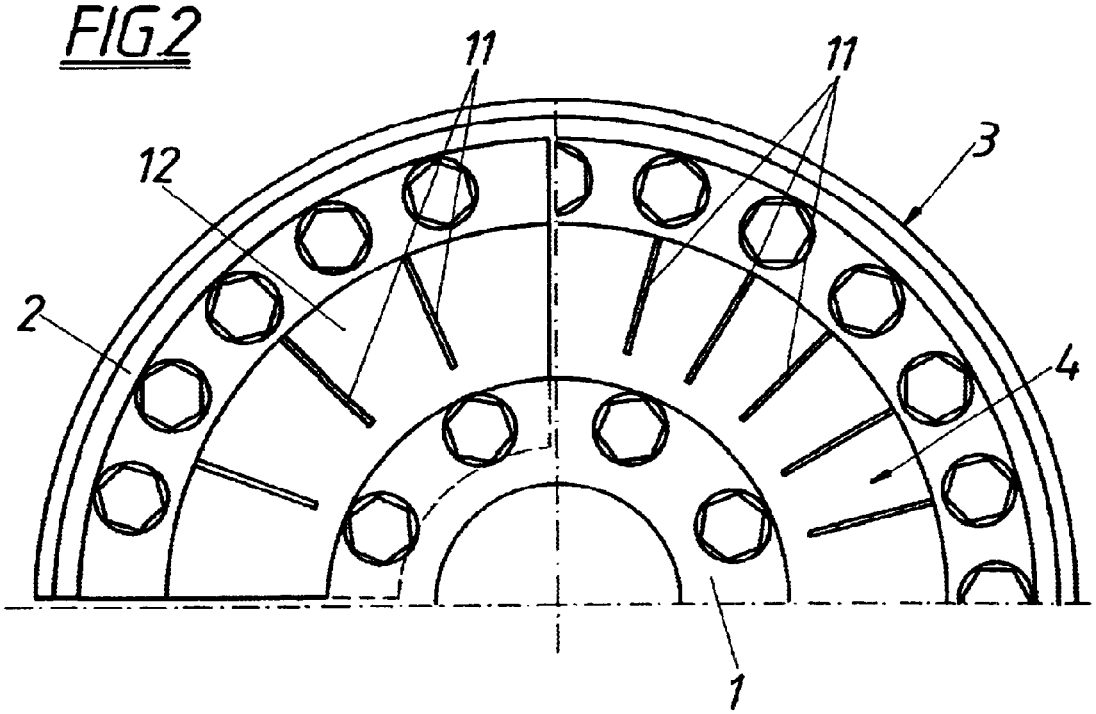
FIG. 2 shows said coupling member in a front view, with the right half representing a comprehensive embodiment and the left half an embodiment subdivided into segments.

According to the embodiment according to FIGS. 1 and 2, the connecting part 4 forms an inner connecting flange 9 from which the ring disk 4 projects outwardly, and the connecting part 5 is provided with an outside fastening flange 10 with an inwardly projecting ring disk 7. The annular body 8 is disposed between the two ring disks 6, 7 which are preferably provided with a wall thickness which tapers towards the outer edge and extend along a conical surface K which is coaxial to the axis A of the coupling member 3, which annular body 8 is provided with a cross section increasing radially outwardly according to the mutual distance between the ring disks 6, 7 and is therefore adapted with respect to its material-related properties to the force and movement conditions which change with increasing radius.

As is shown in FIG. 2, connecting parts 4 can be provided with radial slots 11 in order to increase the axial displacement capability of the coupling member. It is also possible to compose the coupling member not consistently of ring and pipe elements (FIG. 2, right half), but to also subdivide the same into segments 12 in order to facilitate assembly and to install the segments radially over a shaft.

In the embodiment according to FIG. 3, the connecting part 4a forms a hub sleeve 13 with an outwardly projecting ring disk 6a, which hub sleeve 13 is mounted in a torsionally rigid manner on hub 1 of the drive connection. The other connecting part 5a is provided with an outer fastening flange 10 with the inwardly projecting ring disk 7a, so that the ring body 8a is embedded with its substantially trapezoid cross section between the ring disks 6a, 7a. For cooling there are additional air conduits 14 in hub 1 in order to improve the air circulation in the zone of the coupling member 3.

The embodiment according to FIG. 4 is comparable to that of FIG. 3. Merely the ring disks 6b, 7b of the connecting parts 4b, 5b form an undulation 15 in the axial section.

Figure 5:
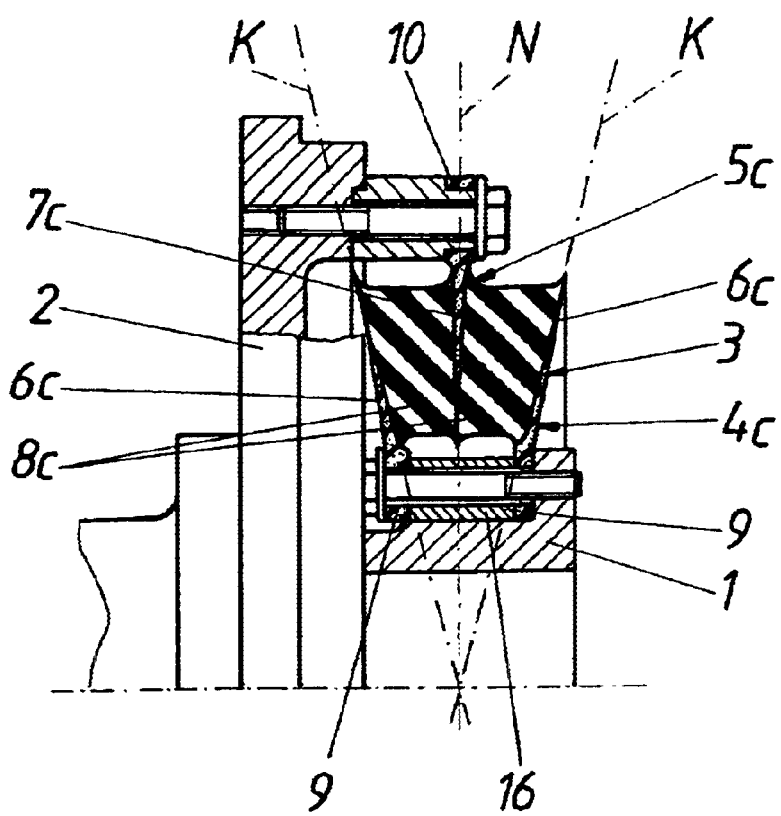

According to the embodiment according to FIG. 5, the connecting part 4c comprises two fastening flanges 9 with outwardly projecting ring disks 6c, which flanges 9 are mutually connected by way of spacer sleeves 16. The connecting part 5c is provided with an outer fastening flange 10 with an inwardly projecting ring disk 7c, with the ring disk 7c engaging centrically between the two other ring disks 6c. The two outside rings disks 6c extend along conical surfaces K. The middle ring disk 7c, on the other hand, extends in an axial normal plane N and the annular body 8c sits on either side between the ring disks 6c and 7c.

Figure 6:
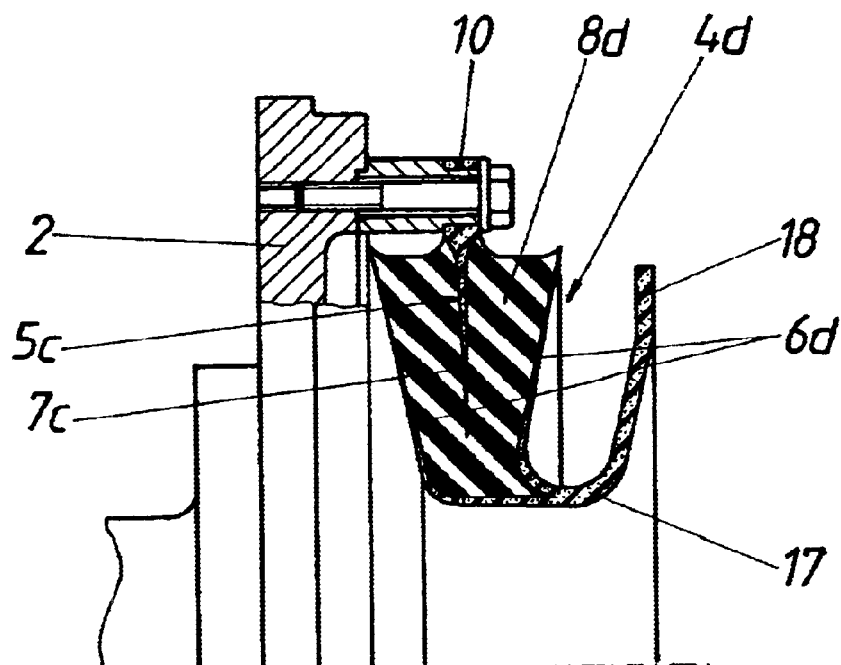

According to the embodiment according to FIG. 6, the connecting part 4d is provided with a pipe section 17 which converges into two outwardly projecting annular disks 6d at the one end and into a fastening flange 18 at the other end. In this case too, the other connecting part 5d, which consists of a fastening flange 10 with an inwardly projecting ring disk 7d, engages with its ring disk 7d in a centered manner between the conically opening ring discs 6d of the connecting part 4d, and annular body 8d is embedded accordingly between the ring disks 6d and 7d.

Figure 7:
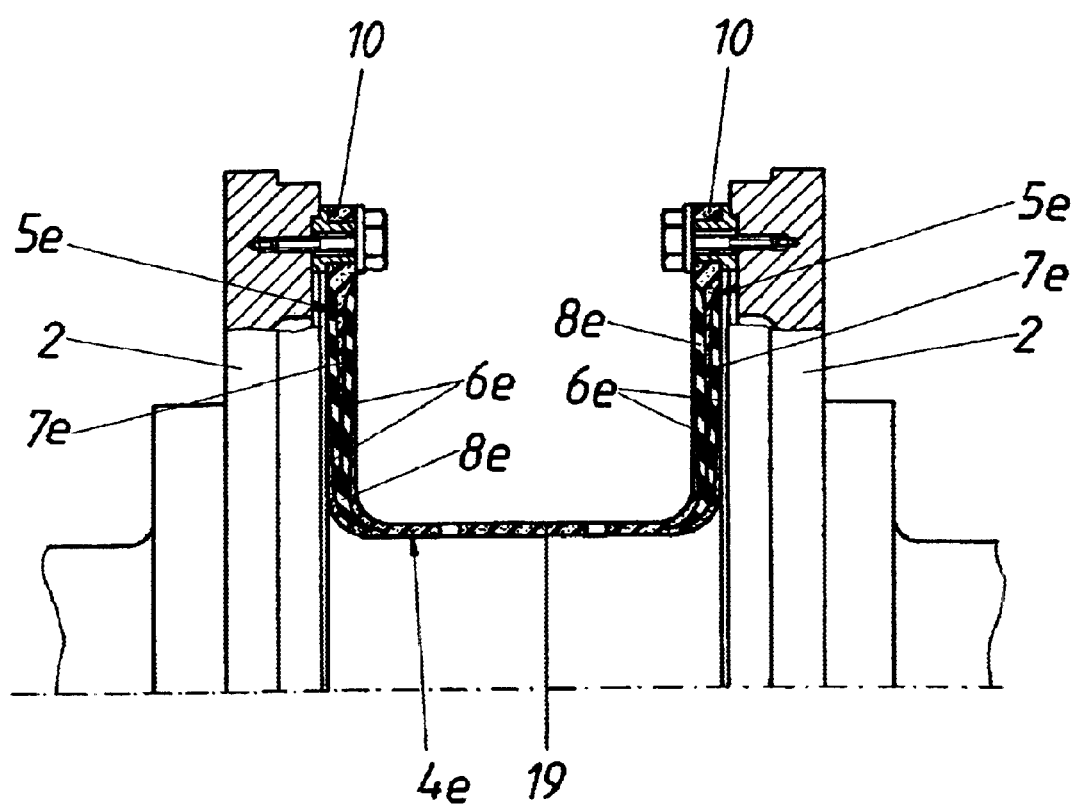

According to the embodiment according to FIG. 7, the one connecting part 4e forms a pipe section 19 which converges at either end into two outwardly projecting ring disks 6e and is used as a connecting part for two other connecting parts 5e. Said connecting parts 5e are provided with an outer fastening flange 10 with an inwardly projecting ring disk 7e which engages between the two other ring disks 6e by interposing annular body 8e. The fastening of the coupling member 3 is performed here on two outside rims 2 of the drive connection via the two similar connecting parts 5e which are associated with connecting part 4e for connection.

Figure 8:
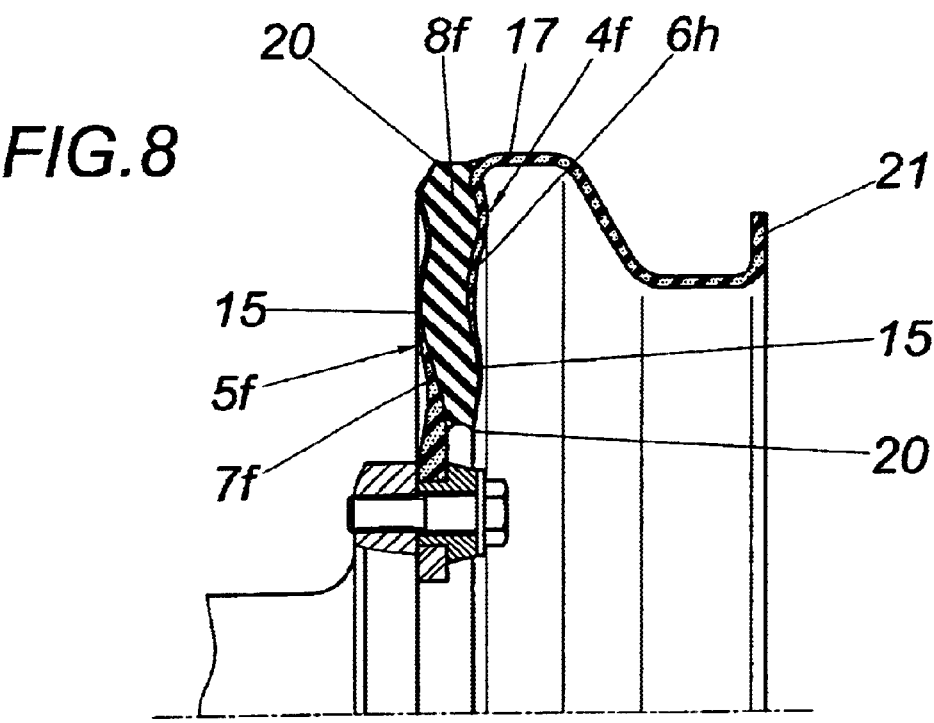
Figure 9:
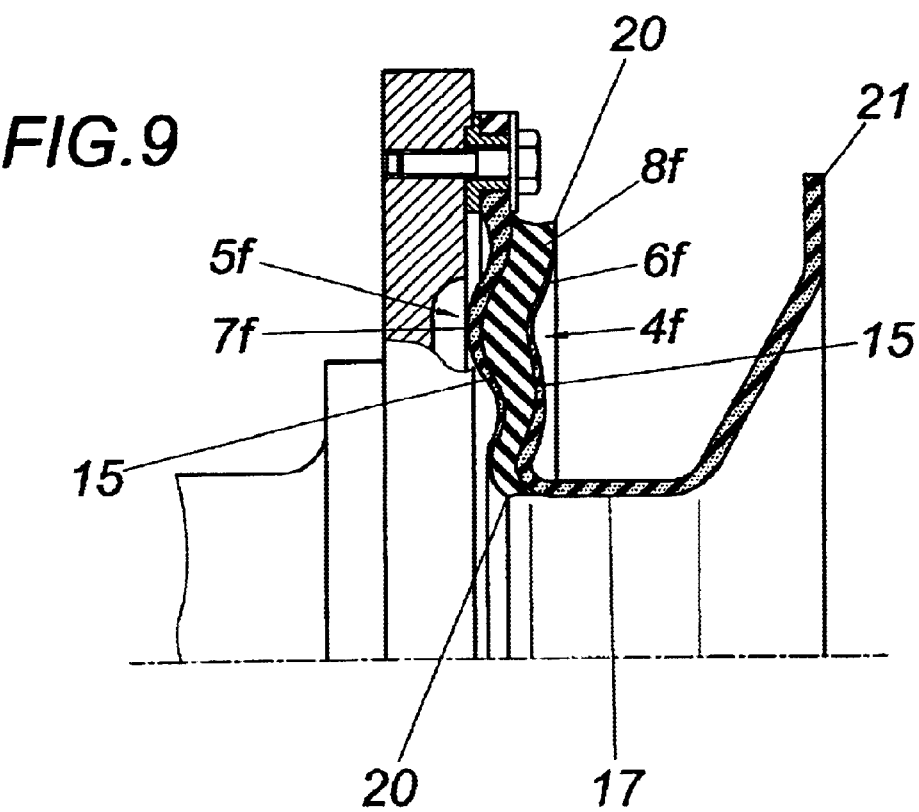

The embodiments according to FIGS. 8 and 9 also comprise, like the embodiment according to FIG. 4, ring disks 6f, 7f which form an undulation 15 in axial section and have a wall thickness which tapers towards the free edge 20. The annular disks 6f, 7f are arranged as cooperating membrane parts which allow both an axial as well as an angular displacement of the flange parts with respect to one another. A very compact arrangement is obtained when one coupling member each according to FIG. 8 and one coupling member according to FIG. 9 are mutually connected by way of the flanges 21. As shown, connecting part 4f forms a pipe section 17 whose ring disk 6f converges from the pipe section at one end thereof and whose other end converges into fastening flange 21. In this way, it is possible to drivably connect in a particularly simple way a flange of a large diameter such as a disk flywheel and a flange of smaller diameter such as that of gear, for example.

What is claimed is:

1. A coupling member for installation in a torque-transmitting drive connection between a driving part and a driven part, which comprises (a) connecting parts of fibrous composite plastic, the connecting parts having ring disks formed by membranes and fastened to the driving part and the driven part, respectively,
   (1) the ring disks forming an undulation in axial section and having a wall thickness tapering in a direction towards a free edge of the ring disks, and
(b) an annular body of an elastomer inserted between the ring disks for torque transmission, the annular body being molded to the ring disks, the ring disks of the connecting parts molded to the annular body of an elastomer enabling the coupling member to be angularly, axially and radially displaceable.

2. The coupling member of claim 1, wherein one of the connecting parts forms a pipe section whose ring disk converges from the pipe section at one end thereof and whose other end converges into a fastening flange.

3. The coupling member of claim 1, wherein the ring disks have radial slots.

4. The coupling member of claim 1, wherein the annular body and/or the connecting parts are sub-divided into segments.

\* \* \* \* \*